(12) United States Patent
Kurozuka et al.

(10) Patent No.: US 7,742,219 B2
(45) Date of Patent: Jun. 22, 2010

(54) MICROMACHINE STRUCTURE

(75) Inventors: Akira Kurozuka, Osaka (JP); Hironori Tomita, Nara (JP); Yoshihiro Mushika, Osaka (JP)

(73) Assignee: Panasonic Corporation, Osaka (JP)

( * ) Notice: Subject to any disclaimer, the term of this patent is extended or adjusted under 35 U.S.C. 154(b) by 357 days.

(21) Appl. No.: 11/910,773

(22) PCT Filed: Apr. 6, 2006

(86) PCT No.: PCT/JP2006/307363

§ 371 (c)(1),
(2), (4) Date: Oct. 5, 2007

(87) PCT Pub. No.: WO2006/109687

PCT Pub. Date: Oct. 19, 2006

(65) Prior Publication Data

US 2009/0279163 A1    Nov. 12, 2009

(30) Foreign Application Priority Data

Apr. 11, 2005    (JP) ............................. 2005-113210

(51) Int. Cl.
G02B 26/00 (2006.01)
G02B 26/10 (2006.01)
G02F 1/29 (2006.01)

(52) U.S. Cl. .................. 359/291; 359/223; 359/317

(58) Field of Classification Search ......... 359/290–292, 359/295, 223–225, 245, 260–263, 298, 198, 359/301–303, 317–318, 237, 242

See application file for complete search history.

(56) References Cited

U.S. PATENT DOCUMENTS

| 5,535,047 A | 7/1996 | Hornbeck |
| 2002/0001322 A1 | 1/2002 | Yamamoto et al. |
| 2002/0118429 A1 | 8/2002 | Miyajima et al. |
| 2004/0061917 A1 | 4/2004 | Mushika et al. |
| 2006/0245032 A1* | 11/2006 | Doan et al. ................. 359/291 |

FOREIGN PATENT DOCUMENTS

JP    08-334709    12/1996

(Continued)

OTHER PUBLICATIONS

International Search Report for corresponding Application No. PCT/JP2006/307363 dated Jul. 18, 006.

(Continued)

*Primary Examiner*—Scott J Sugarman
*Assistant Examiner*—Dawayne A Pinkney
(74) *Attorney, Agent, or Firm*—Renner, Otto, Boisselle & Sklar, LLP

(57) ABSTRACT

A micro-mechanical structure according to the present invention includes: a base 1; an elastic supporting member 5 having elasticity, the elastic supporting member 5 being formed on the base 1; and a movable section supported by the elastic supporting member 5 so as to be capable of making a relative move with respect to the base 1. This movable section includes a movable electrode 6 opposing the base 1 via a first gap, and a mirror 8 being affixed to the movable electrode 6 via a vertical rib 7.

13 Claims, 10 Drawing Sheets

FOREIGN PATENT DOCUMENTS

| | | |
|---|---|---|
| JP | 2002-182136 | 6/2002 |
| JP | 2004-109446 | 4/2004 |
| WO | 02/061488 | 8/2002 |

OTHER PUBLICATIONS

Veljko Milanovic et al.; "Tip-Tilt-Piston Actuators for High Fill-Factor Micromirror Arrays"; Solid-State sensor, Actuator and Microsystems Workshop; Jun. 6-10, 2004; Adriatic Research Institute; pp. 232-237 (cited in [0007], p. 4 of the description).

PCT/ISA/237 and partial translation.

Chinese Office Action for corresponding Application No. 200680008131.8 dated Feb. 6, 2009.

* cited by examiner

MICROMACHINE STRUCTURE

TECHNICAL FIELD

The present invention relates to a micro-mechanical structure, and various devices having the micro-mechanical structure.

BACKGROUND ART

Various micromirror devices have been devised as micro-mechanical structures to which micromachining technology is applied, and their applications to optical scanning apparatuses such as laser printers, scanners, and displays, and optical switching devices to/from which input/output of optical fibers is switched are under study.

Patent Document 1 discloses a reflection-type optical modulation device having an array of micromirrors. This device has been developed as an image displaying device of a video projector, and is known as a DMD (Digital Micromirror Device). Micromirrors of the DMD are formed on CMOS circuitry.

The DMD which is disclosed in Patent Document 1 includes: a bias bus and a pair (left-right) of address electrodes as metal members in a first layer (lowermost layer) upon an oxide film; a twist hinge, a pair of hinge support portions, a yoke, and a pair of elevated electrodes as metal members in a second layer (intermediate layer); and a mirror as a metal member in a third layer (uppermost layer). A positive type photoresist, which is stacked as spacers in between layers, is finally removed by plasma etching. As a result, the yoke and the mirror are pivotably supported by the twist hinge, and are driven so as to pivot in two directions due to an electrostatic attraction that is caused by a difference in potentials applied to the address electrodes and the yoke. A multitude of mirrors are disposed in a two-dimensional array, such that each mirror functions as a pixel and allows light from a light source to be projected toward a screen, whereby a video image is displayed.

The structural parts such as the mirror, the electrodes, the twist hinge, and the yoke are formed from thin films which are obtained by depositing aluminum or an aluminum alloy by sputtering technique. Since each such thin film has a stress gradient along the film thickness direction, there is a problem in that the mirror may be warped when the spacer layers are removed during the production steps.

Since the twist hinge is to be driven by a low voltage, it is thinly formed so as to lower its torsional rigidity. However, the yoke needs to have sufficient rigidity to ensure that the yoke will pivot integrally with the mirror when tilting under an electrostatic attraction, without deforming itself. Therefore, although the twist hinge and the yoke are formed so as to be at the same height from the substrate, they are formed with respectively different thicknesses. Therefore, a step is performed which involves forming a thin aluminum layer composing the twist hinge, and thereafter depositing a first oxide film and patterning it into a hinge shape. Then, using the first oxide film as an etch stop, a removal through plasma etching is performed to also remove a thick yoke layer that is formed thereon. Thus, the shapes of the twist hinge and the yoke are defined. The mirror which is formed on the yoke is linked via a mirror supporting post which is provided in the central portion. Since the mirror and the mirror supporting post are formed of the same aluminum alloy film, a dent of a shape corresponding to the mirror supporting post is formed in the mirror surface.

Non-Patent Document 1 discloses an optical-spatial modulator in which an array of low-inertia micromirrors that are bonded onto actuators are disposed. This construction adopts a method where a plurality of comb-type actuators are used in combination to tilt a central base, with separately-produced mirrors being bonded thereon. An optical modulation is performed by moving up/down or tilting each mirror in the micromirror array of such a construction, whereby wave aberration correction for reflected light, etc., can be performed. For such purposes, the aberration of the individual mirrors themselves may become a problem, and therefore high-precision mirrors having a high planarity are required. Hence, the mirrors and the actuators are fabricated by using an SOI (Silicon-On-Insulator) substrate. By nature, a single-crystalline silicon is free of internal stress, and can produce mirrors with a good planarity.

Furthermore, through a 3-level selective DRIE process, the mirrors are structured so as to have vertical ribs on their rear faces, thus obtaining light-weighted and highly rigid mirrors. Thus, not only rapid response is enabled, but also each mirror is prevented from being warped under the influence of a difference between the coefficients of thermal expansion of an aluminum reflective layer that is provided on the mirror surface and the main body of the mirror.

As for bonding between each actuator chip and each mirror chip, methods are possible such as: a eutectic bonding which involves forming gold bumps or gold-tin solder on the bonding surface; a polymer bonding which involves forming a polyimide film and heating it to about 350° C. while applying a voltage thereto; and so on.

[Patent Document 1] Japanese Laid-Open Patent Publication No. 8-334709

[Non-Patent Document 1] Tip-tilt-piston Actuators for High Fill Factor Micromirror Arrays (Solid-State Sensor, Actuator and Microsystems Workshop, 2004 Adriatic Research Institute)

DISCLOSURE OF INVENTION

Problems to Be Solved By the Invention

However, micro-mechanical structures of conventional constructions have the following problems.

Firstly, in a micromirror array in which a multitude of mirrors are independently driven, the actuators and mirror portions need to be formed integrally with the driving circuit. In order to achieve such integration, it would be efficient to not only form CMOS circuitry on one semiconductor wafer but also to sequentially form actuator portions, mirror portions, and the like, whereby cost can be reduced.

The actuators and mirrors in the micro-mechanical structure disclosed in Patent Document 1 are produced by a production method which has high interchangeability and good matching with the production method for the CMOS circuitry. However, since the mirrors are formed from a thin metal film, the mirrors are likely to be warped due to a stress gradient along the thickness direction that occurs during the film formation step. If the mirrors are warped, it becomes impossible to control the wave aberration of reflected light by using the micromirror array.

Moreover, although the twist hinge and the yoke are formed in positions at the same height, they need to have different thicknesses in order to ensure rigidity of the yoke. This results in complicated processes, e.g., performing separate film formations and using an oxide film as an etch stop, which increases the cost. If the yoke were to be concurrently formed, with the same thickness as that of the twist hinge, the yoke would be deformed due to electrostatic attraction and the mirrors would not be accurately driven. If a multitude of mirror supporting posts were provided for linking the mirrors to the yoke, the mirrors would reinforce even a thin yoke, thus preventing the yoke from deforming. However, a multitude of dents would occur on the mirror surface corresponding to the mirror supporting posts, which would increase the influences of scattering and diffraction of reflected light and therefore not be preferable.

On the other hand, in the construction of Non-Patent Document 1, mirrors of single-crystalline silicon are formed by using an SOI substrate, so that mirrors with good planarity and free of internal stress can be obtained. However, an SOI substrate is expensive; there is a need to bond the mirrors to the actuators; furthermore, it is also necessary to perform bonding to a CMOS circuit chip in order to realize an integral construction with the driving circuit. This makes it very difficult to reduce the cost.

Moreover, in order to decrease the number of substeps in the bonding step, it is desirable to perform the bonding at the wafer level. However, this leads to difficulties of performing uniform bonding across the entire surface of the wafer, thus presenting a problem in production yield improvement. Furthermore, in the case where the actuators are bonded to the mirrors, since the bonding sites exist within the movable section, any mirror whose bonding is imperfect might experience disruption of the bonding during driving, thus lacking in reliability.

Thus, inexpensive production of a micromirror array which is integrated with CMOS circuitry and obtainment of a high-precision mirror array with good planarity have had incompatible aspects.

The present invention has been made in order to solve the aforementioned problems, and an objective thereof is to provide a micro-mechanical structure having a light-weighted and highly rigid movable section which is supported so as to be capable of displacement.

Moreover, another objective of the present invention is to realize rapid operation at a low voltage by reducing the weight of a movable section, a part of which functions as a micromirror, and realize a micromirror with good planarity based on high rigidity.

Means for Solving the Problems

A micro-mechanical structure according to the present invention comprises: a base; an elastic supporting member having elasticity, the elastic supporting member being formed on the base; and a movable section supported by the elastic supporting member so as to be capable of making a relative move with respect to the base, wherein, the movable section includes: a first plate portion opposing the base via a first gap; and a second plate portion having a link portion, the second plate portion being affixed to the first plate portion via the link portion.

In a preferred embodiment, a light reflecting surface is comprised in at least a portion of the second plate portion.

In a preferred embodiment, the link portion is a vertical rib protruding from the second plate portion toward the first plate portion.

In a preferred embodiment, the elastic supporting member and the first plate portion are formed so as to be coplanar with each other, and the elastic supporting member is made integral with the first flat portion; and the second plate portion is shaped so as to cover at least a portion of the elastic supporting member, and the vertical rib is not in contact with the elastic supporting member.

In a preferred embodiment, the vertical rib includes: a portion having a first height so as to be in contact with the first plate portion; and a portion having a second height so as to oppose the elastic supporting member via a second gap, the second height being smaller than the first height.

In a preferred embodiment, the second gap is narrower than the first gap.

In a preferred embodiment, the first plate portion and the elastic supporting member are formed of a same metal material and have a same thickness.

In a preferred embodiment, the second plate portion and the link portion are formed of a same metal material.

In a preferred embodiment, the second plate portion has an area of no less than 100 $\mu m^2$ and no more than 1 $\mu m^2$.

In a preferred embodiment, the first plate portion and the second plate portion each have a thickness of no less than 0.1 μm and no more than 5 μm; and the link portion has a thickness of no less than 0.2 μm and no more than 10 μm.

In a preferred embodiment, the link portion is formed of a metal material which is buried in a trench in a sacrificial layer above the first plate portion.

In a preferred embodiment, the metal material is aluminum, copper, nickel, or an alloy containing at least one such metal.

In a preferred embodiment, a stationary electrode provided on the base is further comprised, the stationary electrode opposing the first plate portion via a third gap, wherein, the first plate portion and the stationary electrode function as an electrostatic actuator.

An optical pickup according to the present invention comprises: a light source for emitting a light beam; an objective lens for converging the light beam onto an optical disk; a photodetector for receiving the light beam reflected from the optical disk and generating an electrical signal; and an aberration correcting device for correcting an aberration of the light beam, wherein, the aberration correcting device includes: a base; an elastic supporting member having elasticity, the elastic supporting member being formed on the base; and a movable section supported by the elastic supporting member so as to be capable of making a relative move with respect to the base, wherein, the movable section includes: a first plate portion opposing the base via a first gap; and a second plate portion having at least one vertical rib, the second plate portion being affixed to the first plate portion via the vertical rib.

An optical disk apparatus according to the present invention comprises: a motor for rotating an optical disk; an optical pickup for accessing a desired track on the optical disk; and a signal processing section for reproducing data from the optical disk based on an output from the optical pickup, wherein, the optical pickup includes: a light source for emitting a light beam; an objective lens for converging the light beam onto an optical disk; a photodetector for receiving the light beam reflected from the optical disk and generating an electrical signal; and an aberration correcting device for correcting an aberration of the light beam, wherein, the aberration correcting device includes: a base; an elastic supporting member having elasticity, the elastic supporting member being formed on the base; and a movable section supported by the elastic supporting member so as to be capable of making a relative move with respect to the base, wherein, the movable section includes: a first plate portion opposing the base via a first gap; and a second plate portion having at least one vertical rib, the second plate portion being affixed to the first plate portion via the vertical rib.

A display device according to the present invention comprises: a light source for emitting a light beam; a light source driving section for modulating an intensity of the light beam in accordance with an image signal; and a scan mirror section for scanning a screen with the light beam, wherein, the scan mirror section includes: a base; an elastic supporting member having elasticity, the elastic supporting member being formed on the base; and a movable section supported by the elastic supporting member so as to be capable of making a relative move with respect to the base, wherein, the movable section includes: a first plate portion opposing the base via a first gap; and a second plate portion having at least one vertical rib, the second plate portion being affixed to the first plate portion via the vertical rib, wherein, the second plate portion functions as a mirror for reflecting the light beam.

Another micro-mechanical structure according to the present invention comprises; a base; an elastic supporting member at least a portion of which is affixed to the base; a movable mirror supported by the elastic supporting member; and a stationary electrode provided on the base, wherein the movable mirror includes: a stationary electrode positioned coplanar with the elastic supporting member, the stationary electrode being formed of a same metal material as that of the elastic supporting member; and a mirror having at least one vertical rib and being affixed to the movable electrode via the vertical rib.

EFFECTS OF THE INVENTION

In accordance with a micro-mechanical structure of the present invention, two plate portions are coupled via a "link portion" which is preferably implemented as a vertical rib, so that a light-weighted and highly rigid movable section is obtained. In a preferable embodiment, the movable section is formed of a thin metal film, a part of which functions as a mirror. In such a case, even if the thin metal film is made thin in order to reduce the weight of the movable section, the movable section maintains a good planarity, so that a micromirror device capable of being rapidly driven can be realized at a low cost.

Moreover, a micro-mechanical structure according to the present invention can suitably be produced by using an MEMS process which is CMOS-interchangeable, and therefore can be easily integrally formed on a wafer having CMOS circuitry.

Figure 1:
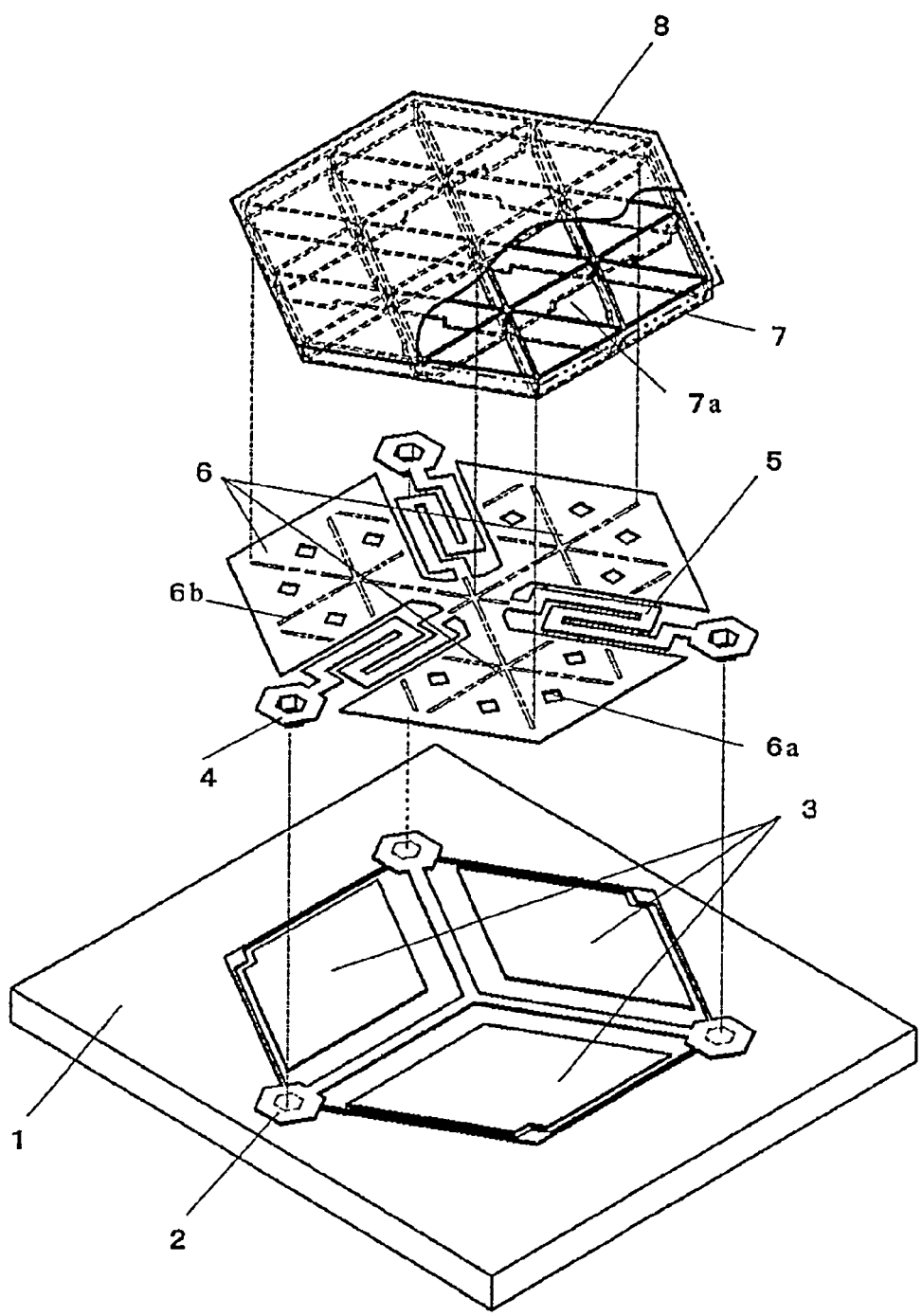
FIG. 1 An exploded perspective view showing a construction according to Embodiment 1 of the present invention.

DESCRIPTION OF REFERENCE NUMERALS 1 base
2 ground electrode
3 stationary electrode
4 support post
5 elastic supporting member
6 movable electrode
7 vertical rib
8 mirror
10, 12, 14 sacrificial layer
11, 13 via
15 trench
17, 18 gap
81 semiconductor laser
82 collimating lens
83 polarization beam splitter
84 ¼ wavelength plate
85 micromirror array device
87 optical disk
86 objective lens
88 actuator
200 optical disk
300 optical pickup
302 disk motor
304 driver amplifier
306 front-end signal processing section
308 encoder/decoder
309 CPU
310 servo control section
100 laser projector
101 laser light source
102 collimating lens
103 dichroic prism
104 projection beam
105 half mirror
106 scan mirror section
107 aperture
110 image signal
111 control section
112 laser modulation circuit
113 mirror driving section
120 screen

BEST MODE FOR CARRYING OUT THE INVENTION

Hereinafter, embodiments of the present invention will be described with reference to the drawings.

Embodiment 1

First, with reference to FIG. 1, a first embodiment of a micro-mechanical structure according to the present invention will be described. FIG. 1 is an exploded perspective view showing a micro-mechanical structure according to the present embodiment, where a mirror is partly cut away so as to show an underlying rib structure.

A base 1 according to the present embodiment includes a silicon substrate on which CMOS circuitry is formed and a planarized insulating layer with which an upper face of the silicon substrate is coated.

On the insulating layer of the base 1, a ground electrode 2 and three stationary electrodes 3 are provided. The ground electrode 2 and the stationary electrodes 3 are formed of an electrically conductive material which is capable of being deposited at a temperature of 450° C. or less. Such an electrically conductive material may be an aluminum (Al) alloy or polysilicon germanium (Poly-SiGe), for example. The ground electrode 2 and the stationary electrodes 3 can both be suitably formed by patterning the same film of electrically conductive material.

Each of the three stationary electrodes 3 shown in FIG. 1 is connected to CMOS circuitry through a via (not shown) which is formed in the insulating layer of the base 1. The CMOS circuitry is constructed so as to allow a driving voltage to be independently applied to each individual stationary electrode 3 in the range from 0 to 5 V. The driving voltage may be set to multiple values of 10 bits, for example.

The three stationary electrodes 3 are all disposed within a hexagonal region. The stationary electrodes 3 have an identical shape (diamond shape), and are disposed so as to be rotation symmetrical by 60° around the center of the hexagonal region. The ground electrode 2 is shaped so as to extend out from the central portion of the hexagonal region through three intervals between the stationary electrodes 3. The three end portions 3 of the ground electrode 2 are made larger than the other portions, with three support posts 4 being formed thereon. The support posts 4 have a function of supporting elastic supporting members 5 and a movable electrode 6 (described next) so as to be spaced apart from the stationary electrodes 3 and the ground electrode 2.

The three elastic supporting members 5 and the movable electrode 6 are present on the same plane. Specifically, the elastic supporting members 5 and the movable electrode 6 are formed of the same electrically conductive material, and are made integral. The movable electrode 6 has a plate shape in which three portions are coupled, the three portions opposing the three stationary electrodes 3 positioned below them with a predetermined gap in between. The three elastic supporting members 5 radially extend out from the central portion of the movable electrode 6, so as to couple to the three support posts 4.

A mirror 8 is provided above the movable electrode 6, the mirror 8 being affixed to the movable electrode 6 by way of vertical ribs 7. In the present embodiment, the movable electrode 6 functions as a "first plate portion", the vertical ribs 7 as a "link portion", and the mirror 8 as a "second plate portion".

As shown in FIG. 1, the vertical ribs 7 extend so as to partition the rear face of the mirror 8 into a plurality of triangles. For the most part, the vertical ribs 7 reach the movable electrode 6 and are adhered to the movable electrode 6; however, recesses 7a are formed in the other portions so as to leave a space from the elastic supporting member 6. In other words, the vertical ribs 7 include portions having a first height (h1) that reaches the movable electrode 6 as well as portions having a second height (h2:h2<h1) for opposing the elastic supporting members 5 while leaving a second gap in between. Portions (vertical rib connecting portions) 6b, at which end faces of the vertical ribs 7 connect to the movable electrode 6, are indicated by "chain double-dashed lines" on the movable electrode 6 in FIG. 1.

The movable electrode 6, the vertical ribs 7, and the mirror 8 are thus integrated, and supported in midair by the elastic supporting members 5. Therefore, a "movable section" according to the present embodiment is constituted by the movable electrode 6, the vertical ribs 7, and the mirror 8.

The movable electrode 6 is electrically connected to the ground electrode 2 via the elastic support 5 and the support posts 4, which are electrically conductive. As a driving voltage is applied to each stationary electrode 3 via CMOS circuitry (not shown) of the base 7, the movable electrode 6 is attracted toward the base 1 due to an electrostatic force acting between each stationary electrode 3 and the movable electrode 6. Since the movable electrode 6, the vertical ribs 7, and the mirror 8 are integrated, the mirror 8 moves together with the movable electrode 6. Based on the balance among the driving voltages applied to the three stationary electrodes 3, the movable section may be driven to translate downward or tilt in multi-axial directions. Note that, when application of driving voltages is stopped, the movable section resumes its original position and posture, due to the elastic restoring forces of the elastic supporting members 5.

Figure 2:
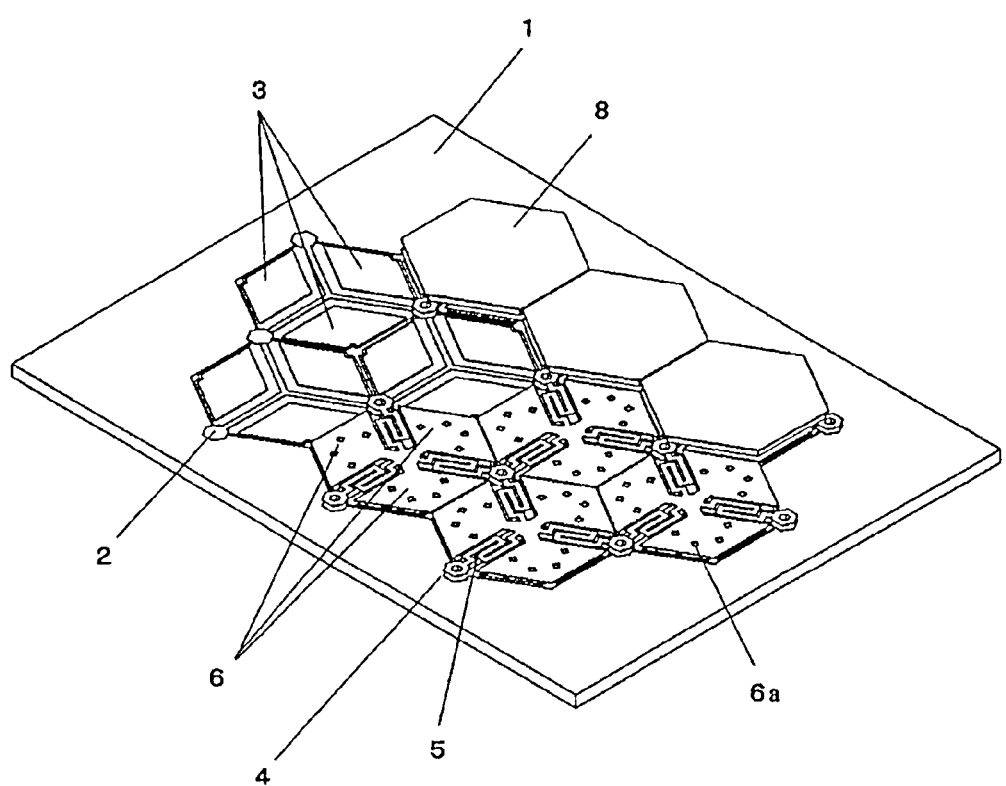
FIG. 2 A perspective view showing an array construction according to Embodiment 1 of the present invention.
Figure 3:
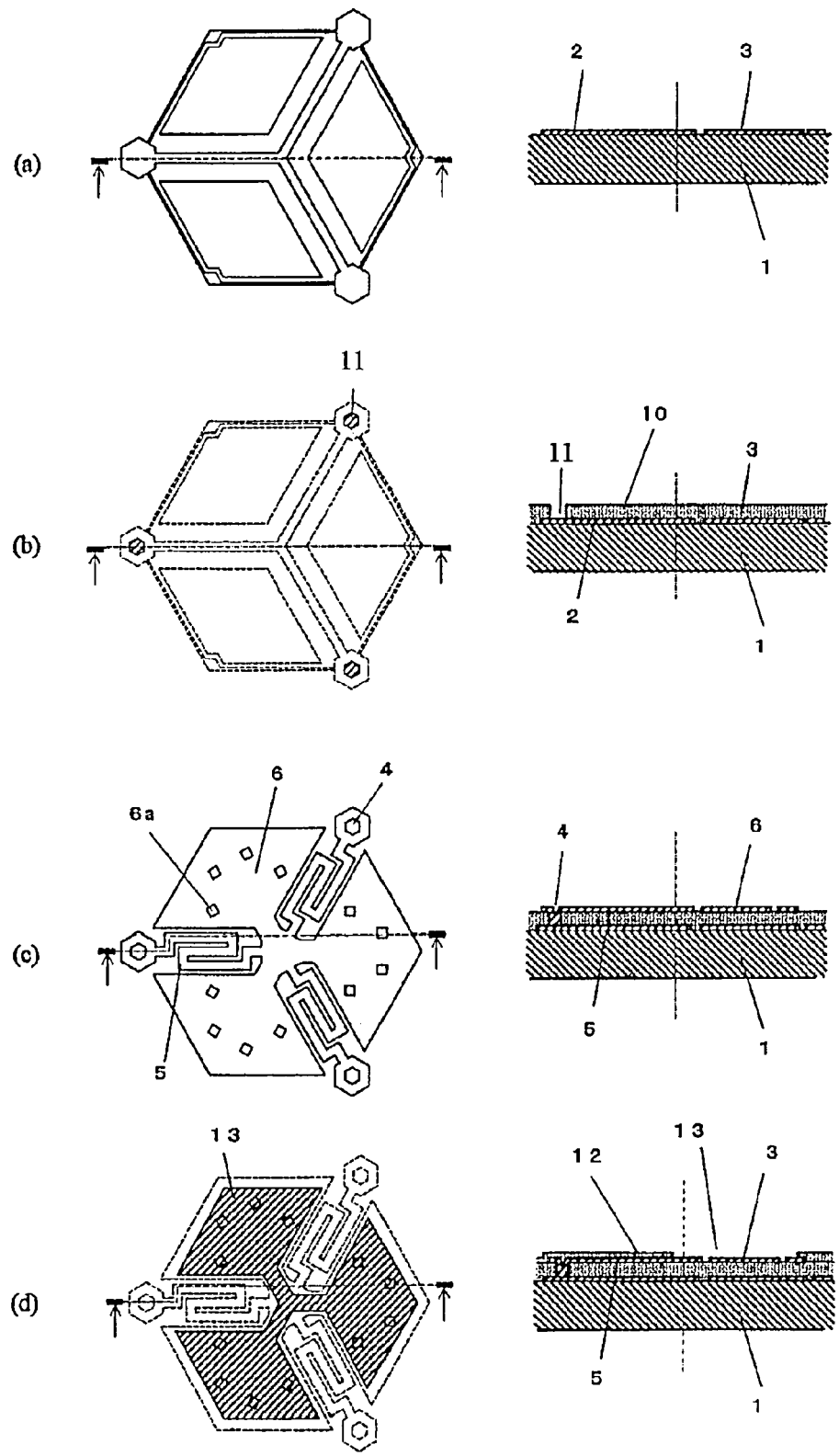
FIG. 3 (a) to (d) are plan views and cross-sectional views showing a production method according to Embodiment 1 of the present invention.
Figure 4:
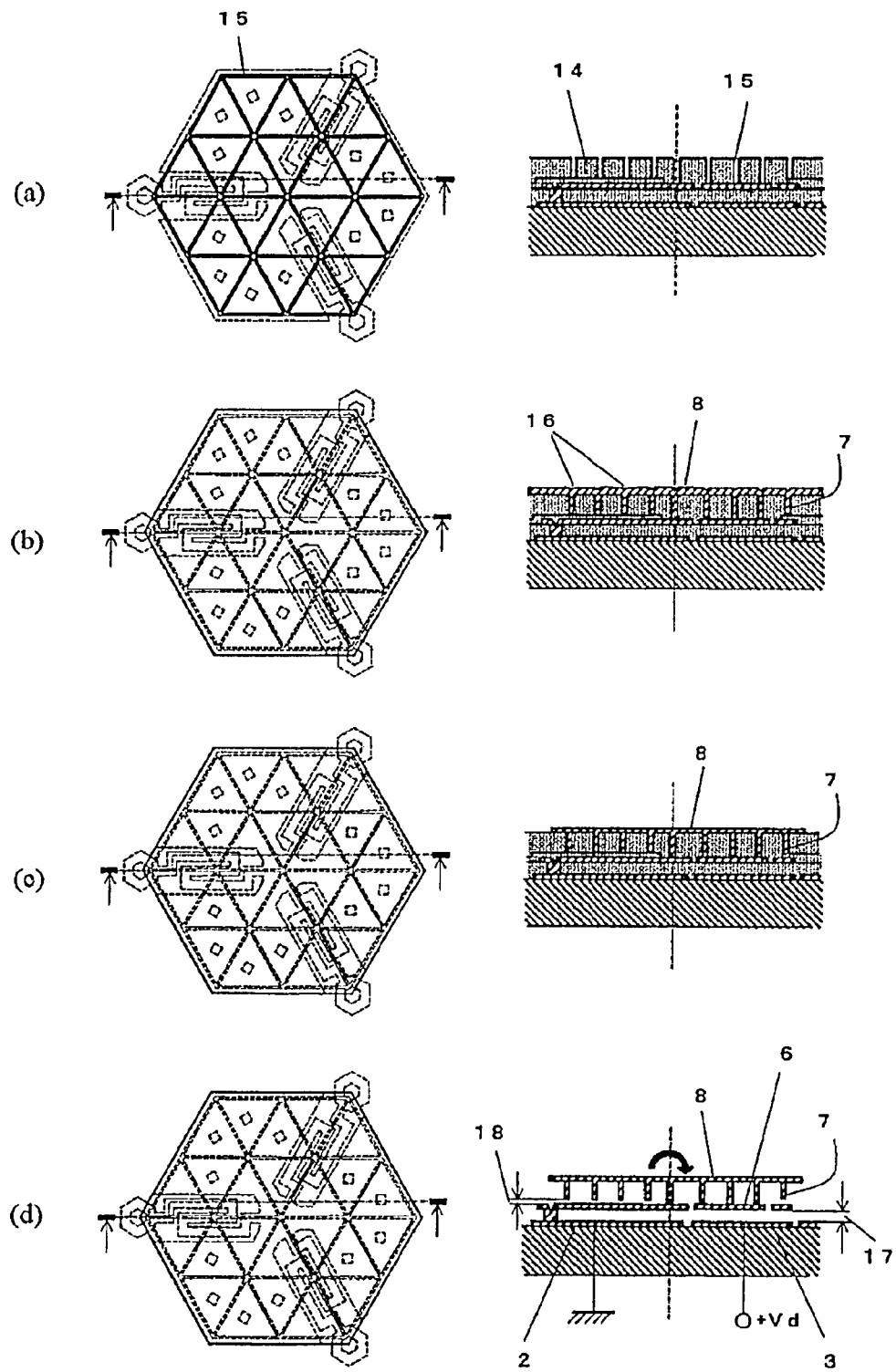
FIG. 4 (a) to (d) are plan views and cross-sectional views showing a production method according to Embodiment 1 of the present invention.

FIG. 2 is a perspective view showing a micromirror array in which movable sections (functioning as "unit mirror cells") shown in FIG. 1 are arrayed in a two-dimensional manner. In FIG. 2, mirror portions as well as movable electrodes and elastic supporting members are partly omitted in order to show the underlying structure.

As shown in FIG. 2, in the micromirror array of the present embodiment, a plurality of mirrors 8 are disposed in a two-dimensional manner, with a constant interval (e.g. 1 μm). Between adjoining cells, elastic supporting members 5 are formed in such a manner as to share support posts 4. Each individual mirror 8 is hexagonal, and such mirrors 8 are densely arrayed on the base 1. As appropriate, the area of the mirrors 8 is set to an optimum size which is in accordance with the purpose of the micromirror device and the number of mirrors 8, and is set to a range of no less than 100 μm$^2$ and no more than 1 mm$^2$, for example.

By varying the driving voltage which is applied to each individual stationary electrode 3, the translation/tilt operation of each mirror 8 can be controlled. By appropriately controlling the positions and postures of the plurality of mirrors 8, an arbitrary wavefront shape can be formed as a whole. With such a micromirror array, the wave aberration of reflected light can be controlled.

The number of unit mirror cells may be determined in accordance with the accuracy which is required for the wavefront to be formed by the micromirror array. As the number of unit mirror cells is increased, the approximation accuracy of wavefront will be improved, but the amount of control data for the mirrors will become enormous, thus imposing an increased load on the control circuit. Moreover, the transfer rate of control data bottlenecks and greatly lowers the response speed of the entire micromirror array. Therefore, the number of mirrors should be minimized within a range which permits obtainment of a necessary approximation accuracy.

In the present embodiment, in order to control the aberration of the wavefront of a light beam having a diameter of 2 mm, the size (width) of each mirror cell is set to about 100 μm, so that twenty unit mirror cells are included within the light-receiving region.

Preferably, the required amount of displacement of each mirror 8 is set to a sum of about half the size of the wavelength of the light beam plus an amount of displacement that is necessary for obtaining the maximum tilt of each mirror 8. The maximum tilt is to be determined based on the amount of aberration to be corrected. For example, in the case of correcting the aberration of blue laser having a wavelength of 405 nm, the maximum amount of displacement may be set to: a half wavelength of 203 nm+a tilt of about 400 nm=0.6 μm.

Hereinafter, with reference to FIG. 3(a) to FIG. 4(d), a production method according to the present embodiment will be described. FIG. 3(a) to FIG. 4(d) are a plan view (left-hand side) and a cross-sectional view (right-hand side) showing the respective steps. Note that each cross-sectional view is a schematic diagram representing characteristic portions of the structure, and does not necessarily accurately reflect the actual sizes of film thickness and the like.

First, formation as shown in FIG. 3(a) is performed on a base 1. Typically, after depositing an aluminum film having a thickness of 0.5 µm by sputtering technique, the aluminum film is patterned through a photolithography and etching step. Note that, as described earlier, the base 1 is obtained by coating the uppermost layer of CMOS circuitry, which is formed on a silicon substrate, with an insulating layer and planarizing it. Although not shown, the ground electrode 2 and the stationary electrodes 3 are electrically connected to the CMOS circuitry formed on the base 1, through contact vias which are provided in the insulating layer.

Next, as shown in FIG. 3(b), a sacrificial layer 10 covering the ground electrode 2 and the stationary electrodes 3 is formed. The sacrificial layer 10 may be formed from a photoresist or photosensitive polyimide, for example. As the photoresist, for example, AZP4000 series from AZ Electronic Materials or the like can be used. As the photosensitive polyimide, for example, PI2727 from HD MicroSystems or the like can be used. Such a photoresist or photosensitive polyimide is applied by spin coating technique, and thereafter is worked into a pattern having vias 11 through exposure/development, and is cured through UV curing.

The thickness of the sacrificial layer 10 defines an interelectrode gap, and each via 11 has a shape defining a support post 4. When undergoing a displacement of ⅓ or more of the inter-electrode gap, an electrostatic actuator may become pulled-in and uncontrollable. Therefore, the inter-electrode gap (i.e., thickness of the sacrificial layer 10) of the present embodiment is set to a size (3 µm) which is five times as large as the maximum amount of displacement (0.6 µm).

Next, as shown in FIG. 3(c), after depositing a metal layer on the sacrificial layer 10, the metal layer is patterned through a photolithography and etching step, thus forming elastic supporting members 5 and a movable electrode 6 from the metal layer. As the metal layer, an aluminum alloy can be suitably used. When patterning the metal layer, etching holes 6a are formed in the metal layer (movable electrode 6) at the same time. In accordance with the spring modulus of the elastic supporting members 5, the thickness of the metal layer is determined as appropriate. In the present embodiment, the spring modulus is determined so that a maximum displacement can be obtained at a driving voltage of 5 V, and the thickness of the metal layer, i.e., the thickness of the elastic supporting members 5, is set at 0.3 µm.

Since the movable electrode 6 and the elastic supporting members 5 are formed from the same metal layer, the movable electrode 6 has the same thickness as that of the elastic supporting members 5. Therefore, the movable electrode 6 has a flexural rigidity similar to the flexural rigidity of the elastic supporting members 5. If the movable electrode 6 is electrostatically driven without providing reinforcement in terms of mechanical strength, the movable electrode 6 will also be deformed toward the stationary electrodes 3 simultaneously with deformation of the elastic supporting members 5. However, in the present embodiment, the overall rigidity of the movable section is improved by the action of the vertical ribs 7, whereby the aforementioned deformation is prevented. The movable electrode 6 and the mirror 8 each have a thickness of no less than 0.1 µm and no more than 5 µm, for example, and the thickness of the vertical ribs 7 is no less than 0.2 µm and no more than 10 µm, for example.

Thus, according to the present embodiment, the thickness of the elastic supporting members 5 and the thickness of the movable electrode 6 do not need to be designed at different values, but they may be formed from the same electrically conductive film through a single photolithography and etching step, whereby the production process is simplified.

Next, as shown in FIG. 3(d), a sacrificial layer 12 is applied on the metal layer by spin coating technique, and a via (opening) 13 is formed within the region of the movable electrode 6. The sacrificial layer 12 is formed from a similar material and in a similar manner to those of the sacrificial layer 10.

The via 13 is shaped and sized so as to expose a large part of the upper face of the movable electrode 6. The sacrificial layer 12 completely covers the elastic supporting members 5. The sacrificial layer 12 defines a gap between the lower end of the vertical ribs 7 and the elastic supporting members 5. In other words, by adjusting the thickness of the sacrificial layer 12, this gap can be controlled. In consideration of variations in the thickness of the sacrificial layer 12, this gap is set so as to be greater than the maximum displacement stroke of the movable section. The thickness of the sacrificial layer 12 in the present embodiment, which is smaller than the thickness of the sacrificial layer 10, is set to about 1.5 µm. The sacrificial layer 12 is also cured by UV curing.

Next, as shown in FIG. 4(a), after the sacrificial layer 14 is applied by spin coating technique, it is patterned through a photolithography and etching step, thus forming trenches 15. In order to enable patterning with a high aspect ratio, it is preferable to use a resist for thick application (e.g., TSMR-iN1000PM from Tokyo Ohaka Kogyo Co., Ltd.) for the sacrificial layer 14. The thickness of the sacrificial layer 14 defines the height (h1) of the vertical ribs 7, and the width of the trenches 15 defines the width (w) of the vertical ribs 7. The height h1 and the width w of the vertical ribs 7 are to be determined in consideration of the overall rigidity of the "movable section", into which the movable electrode 6, the vertical ribs 7, and the mirror 8 are integrated. In the present embodiment, the height h1 of the vertical ribs is set at 10 µm, and the width w is set to 1 µm.

Next, as shown in FIG. 4(b), a metal layer 20 is deposited over the sacrificial layer 14 so as to bury the trenches 15 with metal. The mirror 8 having the vertical ribs 7 is to be formed from the metal layer 20. The metal layer 20 may suitably be formed by any formation technique capable of good film formation in deep trenches, e.g., a method of sputtering an aluminum alloy by collimating sputtering or long throw sputtering, a method in which a plating of copper or nickel is used for burying, or the like. In each trench 15, a film uniformly grows in from both side walls toward the center of the trench 15, so as to merge in the center of the trench 15. By further continuing film formation, not only portions functioning as the ribs 7, but also a portion functioning as the mirror 8 can be successively formed. Immediately after the film formation, recesses 16 corresponding to the positions of the trenches 15 are left on the surface of the portion of the metal layer 20 functioning as the mirror 8. The formation step of the metal layer 20 will be described later in more detail.

After the metal layer 20 is formed, as shown in FIG. 4(c), the surface of the metal layer 20 is polished by CMP (Chemical Mechanical Polishing), thus forming a mirror surface. After a resist mask (not shown) is formed through a photolithography step, the metal layer 20 is processed by wet etching into an array of a plurality of hexagonal patterns, thus forming a plurality of mirrors 8 from the metal layer 20. In the case where an aluminum alloy is used as the material of the metal layer 20, the surface of the metal layer 20 can be utilized as a mirror surface having a high reflectance. In the case where another metal, e.g. copper, is used as the material of the metal layer, it is preferable to deposit a thin reflective layer of aluminum or silver on its surface.

Next, as shown in FIG. 4(d), the sacrificial layers 14, 12, and 10 are removed by oxygen plasma etching, thus releasing the "movable section". The portions where the sacrificial layer 10 has been removed form a gap 17, whereas the portions where the sacrificial layer 12 has been removed form a gap 18. By removing the sacrificial layers 14, 12, and 10, the "movable section", which is composed of the elastic supporting members 5, the movable electrode 6, and the mirror 8, becomes capable of displacement.

The ground electrode 2 thus formed is grounded, and when a driving voltage +Vd is applied to the stationary electrodes 3 shown in FIG. 4(d), an electrostatic attraction will act between the stationary electrodes 3 and the opposing movable electrode 6. With this electrostatic attraction, the mirror 8 will pivot in the direction of an arrow in FIG. 4(d). If the same voltage is applied to every stationary electrode 3 in the unit cell, the mirror 8 will translate in a direction of approaching the base 1.

Next, with reference to FIG. 5(a) and FIG. 5(b), a step of burying the trenches 15 formed in the sacrificial layer 14 with the metal layer 20 will be described in detail.

Figure 5:
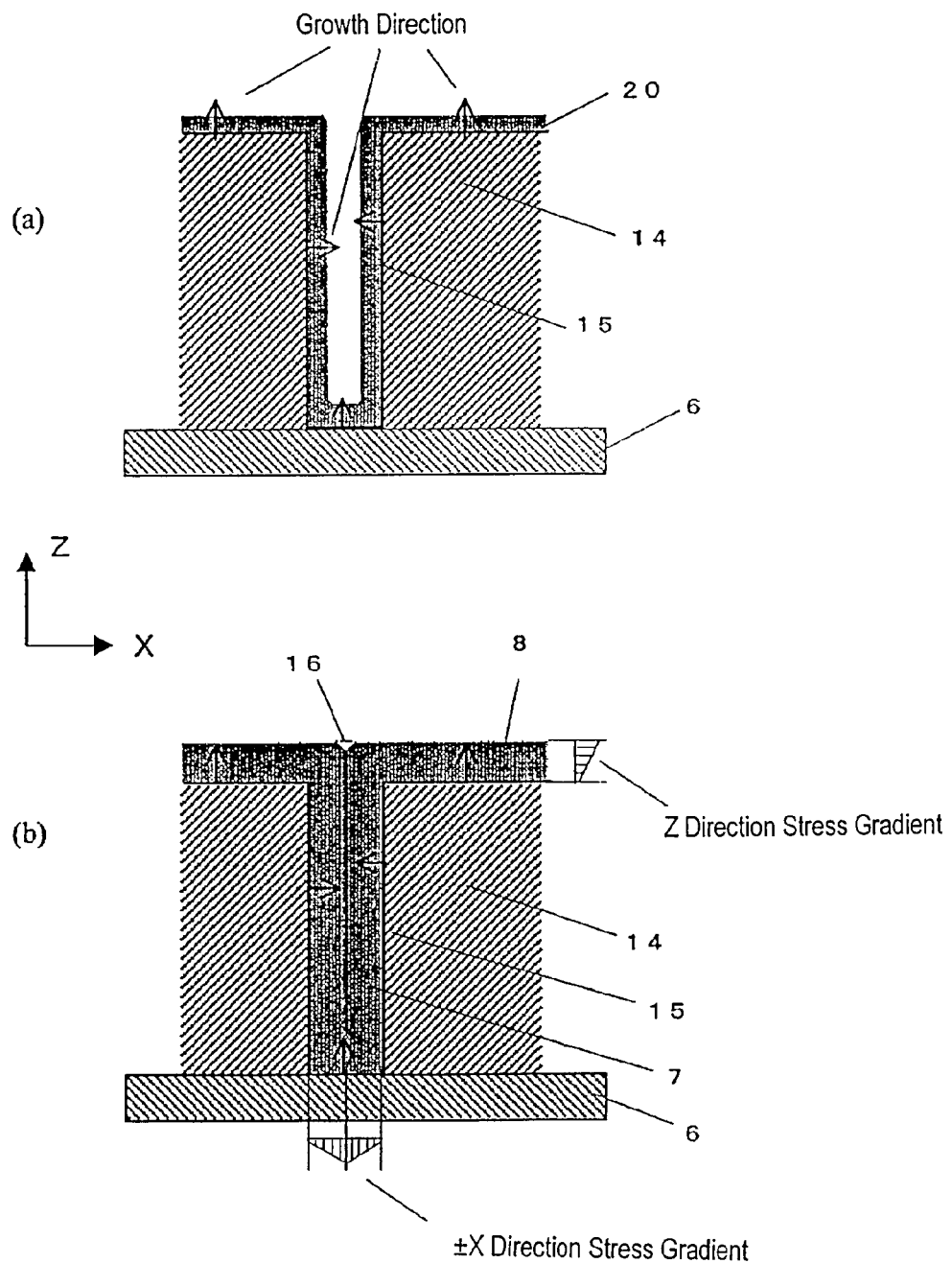
FIGS. 5 (a) and (b) are enlarged views showing a trench portion according to Embodiment 1 of the present invention.

When the metal layer 20 is deposited by a method such as collimating sputtering, growth progresses in directions shown by arrows in FIG. 5(a). Generally speaking, when a metal layer is deposited by a method such as sputtering, residual stress occurs in the growth direction, so that a stress gradient will remain in the growth direction. This stress distribution will change in various manners, depending on the film forming conditions such as the deposition rate or deposition temperature.

Now, a case will be discussed where a stress gradient occurs in a such manner that there is an increasing compressive stress along the growth direction. In this case, in the portion of the metal layer 20 to become the mirror 8, a stress gradient in the +Z direction occurs, thus resulting in a bending moment for causing a warp to protrude in the lower direction. On the other hand, in the portions of the metal layer 20 which are buried in the trenches 15 (i.e., the portions to become the vertical ribs 7), growth progresses from the two opposite side faces of the trenches 15 toward the center of the trenches 15, so that a stress gradient occurs in a symmetric manner in both ±X direction. As a result, as shown in FIG. 5(b), the metal which has grown from the side faces of the trenches 15 finally merges at the central portion of the trenches 15, whereafter the stress gradient in this portion is canceled. In other words, no stress gradient in the Z direction occurs at the vertical ribs 7, which are formed within the trenches 15. Therefore, the vertical ribs 7 do not have a stress gradient in the Z direction, and do not in themselves produce any bending moment for causing a warp. Therefore, by setting the width and height of the vertical ribs 7 so as to provide a sufficient rigidity for correcting the warp of the mirror 8, warping of the mirror 8 due to a stress gradient can be suppressed. Furthermore, since the movable electrode 6 is also connected at the lower end of the vertical ribs 7, the movable section which is composed of the movable electrode 6, the vertical ribs 7, and the mirror 8 can realize a very rigid construction, even with a thin film thickness.

Furthermore, making the second gap narrower than the first gap (i.e., inter-electrode gap) results in the following effects. In a minute structure, when the movable electrode 6 is attracted toward the base 1, the movable electrode 6 may come abnormally near and contact the stationary electrodes 3 due to a disturbance, impact force, or the like. In such a case, the electrodes may suck to each other due to moisture on the electrode surfaces, etc., such that the original state cannot be restored after voltage application is stopped, even with the elastic forces of the elastic supporting members 5. Such sucking, called "sticking", is more likely to occur as the contact area increases. In the present embodiment, since the second gap is narrower than the first gap, the end faces of the vertical ribs 7, which were opposing via the second gap, will come in contact with the upper faces of the support posts 4 first, before the electrodes which were opposing via the first gap can come in contact with each other. At this time, the elastic supporting members 5 are for the large part displaced with the movable section, so that only narrow regions in the end faces of the vertical ribs 7 will come in contact with the upper faces of the support posts 4. Therefore, the area of contact between the vertical ribs 7 and the support posts 4 is small, and sticking is unlikely to occur between them.

According to the present embodiment, it is unnecessary to separately provide protrusions to serve as stoppers between electrodes for preventing sticking.

Embodiment 2

In Embodiment 1, the three elastic supporting members 5 and the movable electrode 6 are present on the same plane, and are formed of the same electrically conductive material. The planar layout of the elastic supporting members and the movable electrode is not limited to that shown in Embodiment 1.

Figure 6:
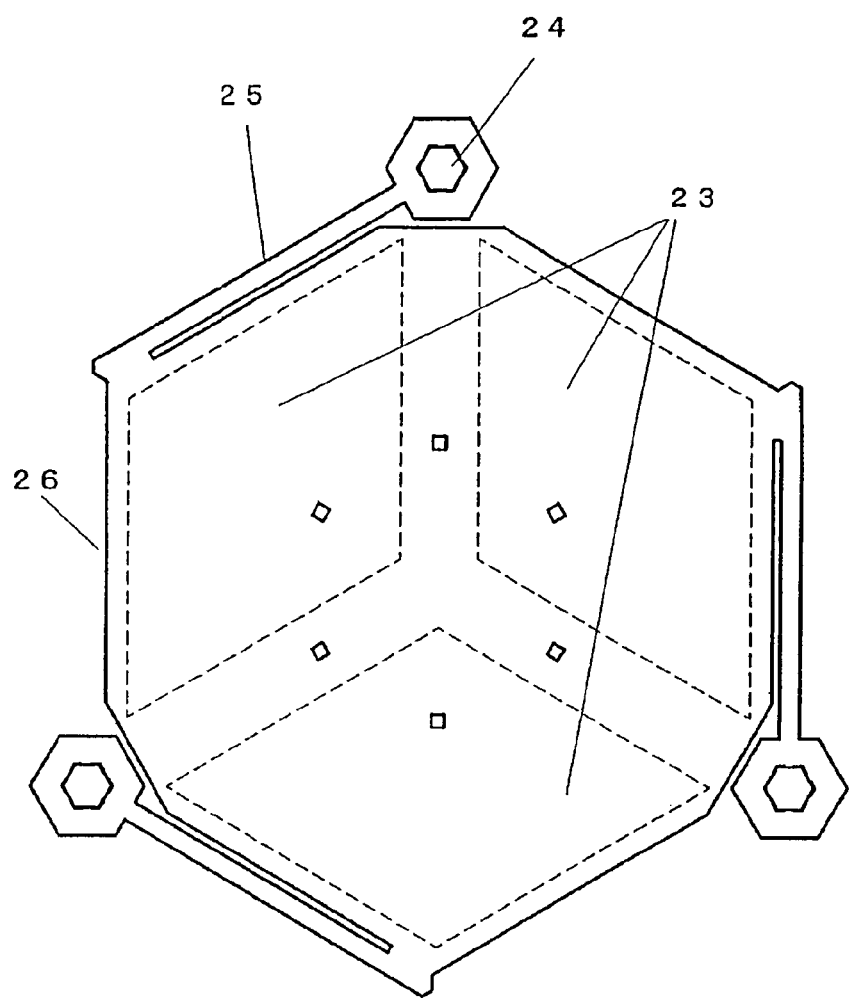
FIG. 6 A plan view showing the shapes of elastic supporting members and a movable electrode according to Embodiment 2 of the present invention.

FIG. 6 shows a planar layout of another exemplary construction of the elastic supporting members 5 and the movable electrode 6. In the present embodiment, along the outer periphery of a hexagonal movable electrode 26, elastic supporting members 25 extend from three support posts 24, so as to link to a movable electrode 26. Below the movable electrode 26, three stationary electrodes 23 shown by broken lines are disposed.

In the present embodiment, too, the elastic supporting members 25 and the movable electrode 26 are suitably formed by patterning the same metal film. Other than the elastic supporting members 25 and the movable electrode 26, the construction is similar to the construction in Embodiment 1. In the present embodiment, the mirror 8 does not need to cover the elastic supporting members 25, but in order to reduce interspaces between adjoining mirrors 8 and increase the area ratio occupied by the mirrors 8, it is desirable that each mirror 8 is designed so as to have a shape and size covering the elastic supporting members 25. In the case where each mirror 8 covers the elastic supporting members 25, vertical ribs 7 do not need to be provided above the elastic supporting members 25. However, in order to prevent the aforementioned sticking between electrodes, it is preferable to dispose the vertical ribs 7 also above the elastic supporting members 25, while creating a second interspace between the elastic supporting members 25 and the vertical ribs 7.

Embodiment 3

Figure 7:
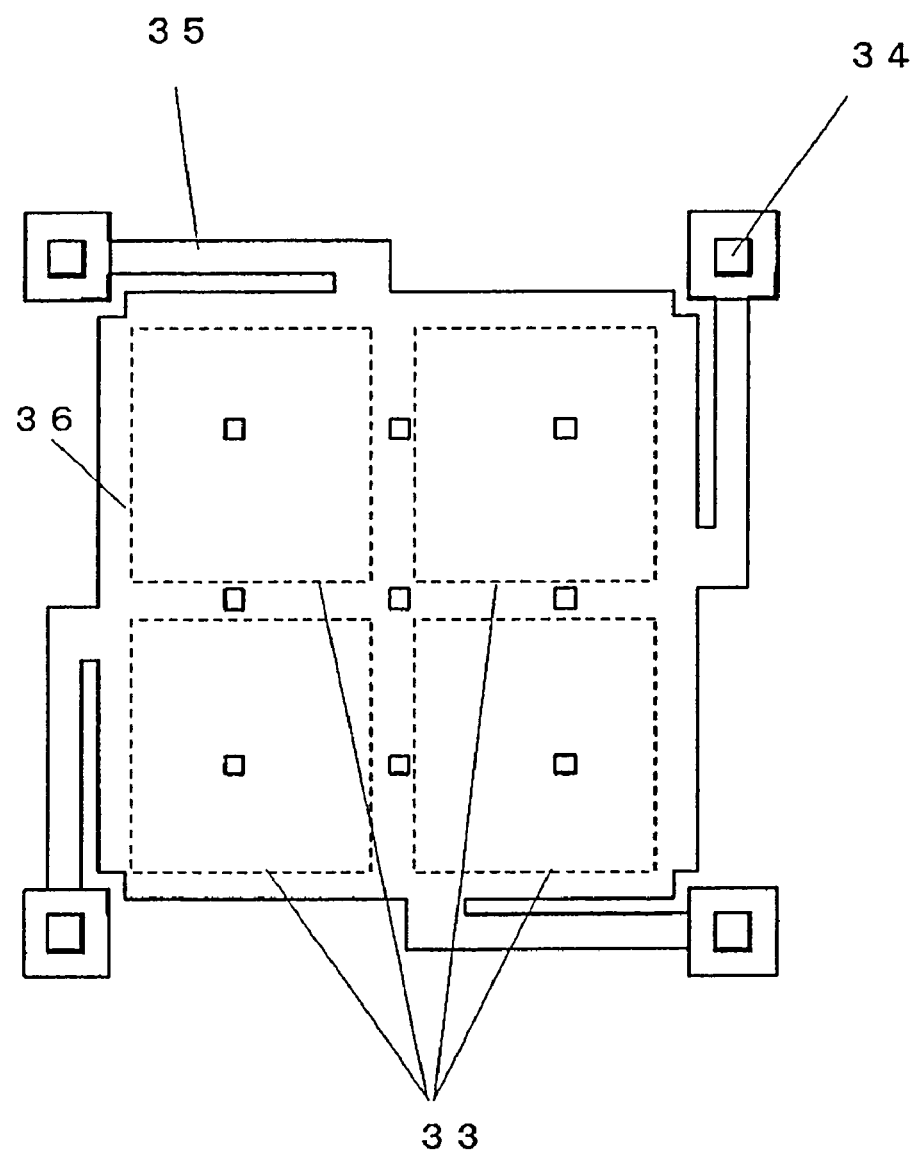
FIG. 7 A plan view showing the shapes of elastic supporting members and a movable electrode according to Embodiment 3 of the present invention.

The shape of the movable electrode does not need to be hexagonal. FIG. 7 shows a square movable electrode 36. In the present embodiment, along the outer periphery of a movable electrode 36 having a square shape, elastic supporting members 35 extend from four support posts 34, so as to link to the movable electrode 36. Below the movable electrode 36, four stationary electrodes 33 shown by broken lines are disposed.

The number of stationary electrodes within each unit cell is not limited to 3 or 4, but may be 2, or 5 or more. However, in order to realize displacement along three axes, it is preferable to assign three or more stationary electrodes to one movable electrode.

As is illustrated in Embodiments 1 to 3 above, the movable electrode and the mirror are coupled via vertical ribs (link portions), whereby the movable section can have both a light weight and a high rigidity. Moreover, there is provided an increased design freedom for the elastic supporting members in the case where the movable electrode and the elastic supporting members are formed from the same metal film.

In accordance with the micro-mechanical structure of the present invention, a light-weighted and highly rigid mirror array can be formed through a process which is interchangeable with CMOS processes, so that it is unnecessary to employ an expensive SOI substrate or employ a wafer bonding step. As a result, it is possible to provide a micromirror device which is excellent in terms of reliability and producibility.

Such a micromirror device is capable of rapid operation at a low voltage and has a very good planarity, and therefore may be provided within an optical pickup of an optical disk apparatus to be used for the purpose of wave aberration correction.

Embodiment 4

Figure 8:
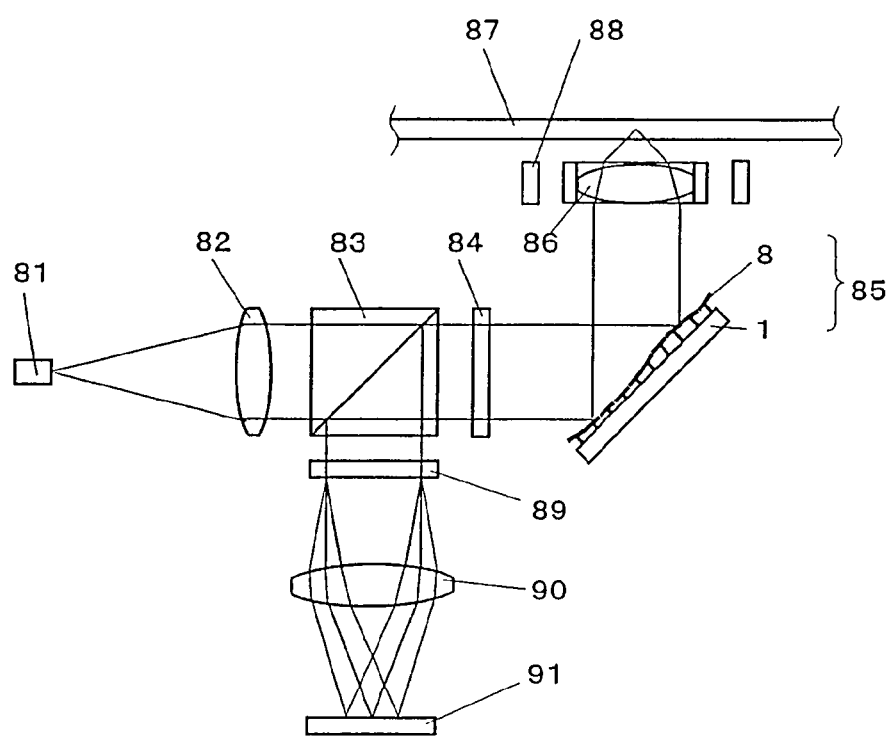
FIG. 8 A diagram showing an embodiment of an optical pickup according to the present invention.
Figure 9:
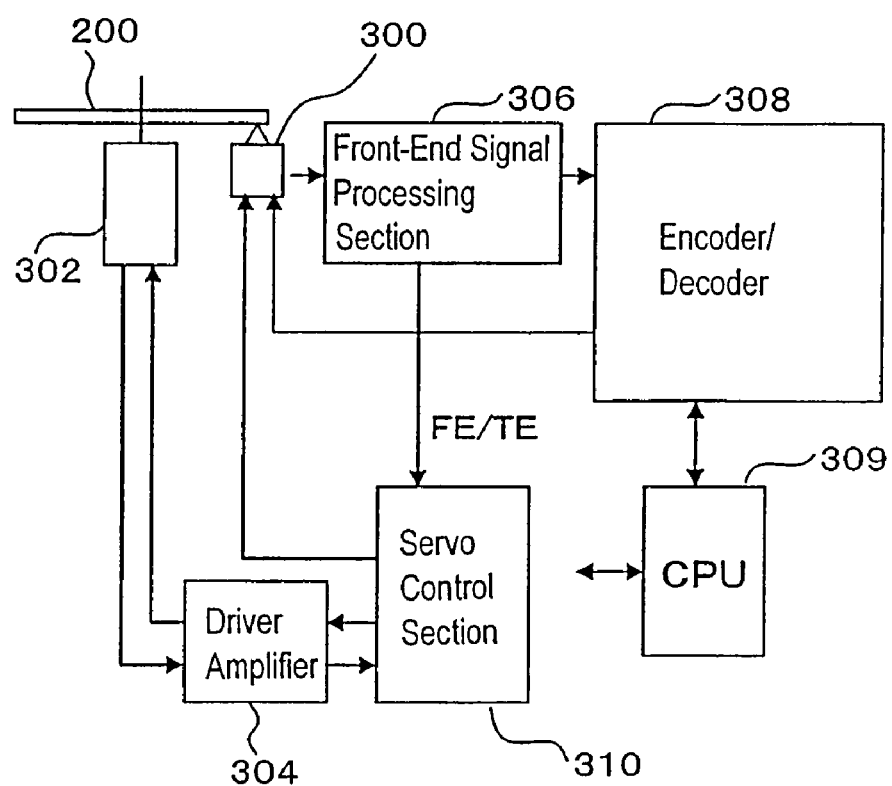
FIG. 9 A diagram showing an embodiment of an optical disk apparatus according to the present invention.

FIG. 8 shows an exemplary construction of an optical pickup having the micro-mechanical structure according to the present invention. FIG. 9 shows an exemplary construction of an optical disk apparatus having the optical pickup.

The optical pickup of FIG. 8 includes: a semiconductor laser 81 for emitting laser light; a collimating lens 82 for collimating laser light; a polarization beam splitter 83 for reflecting linearly polarized light which is polarized in a predetermined direction; a ¼ wavelength plate 84 for converting linearly polarized light into circularly polarized light; a micromirror array device 85; an objective lens 86 for converging laser light onto an optical disk 87; and an actuator 88 for changing the position of the objective lens 86.

The micromirror array device 85 is constructed so that a multitude of mirror portions 8 as shown in FIG. 2 are arrayed on a substrate 1. A voltage is supplied by a driving circuit (not shown) to a stationary electrode that is assigned to each individual mirror portion 8 of the micromirror array device 85, whereby the positions and postures of the mirror portions 8 are controlled.

By adjusting a reflection surface which is created by all of the mirror portions 8 of the micromirror array device 85 as a whole, the wavefront phase of incident rays is controlled based on the shape of the reflection surface, whereby optical parameters such as spherical aberration can be controlled.

Although FIG. 8 illustrates a single light source 81, a plurality of light sources may be provided within one optical pickup.

Next, with reference to FIG. 9, an embodiment of an optical disk apparatus according to the present invention will be described. This embodiment includes: an optical pickup 300 having the construction shown in FIG. 8; a disk motor 302 for rotating an optical disk 200; and a portion performing various kinds of signal processing.

In the example shown in FIG. 9, an output from the optical pickup 300 is sent to an encoder/decoder 308 via a front-end signal processing section 306. During data read, the encoder/decoder 308 decodes data which is recorded on the optical disk 200, based on the signal which is obtained from the optical pickup 300. During data write, the encoder/decoder 308 encodes user data, and generates a signal to be written to the optical disk 200, which is sent to the optical pickup 300.

The front-end signal processing section 306 generates a reproduction signal based on the output from the optical pickup 300, and also generates a focus error signal FE and a tracking error signal TE. The focus error signal FE and the tracking error signal TE are sent to a servo control section 310. The servo control section 310 controls the disk motor 302 via a driver amplifier 304, and also controls the position of the objective lens via the actuator within the optical pickup 300.

Component elements such as the encoder/decoder 308 and the servo control section 310 are controlled by a CPU 309.

The optical disk apparatus according to the present invention is not limited to that which has the construction shown in FIG. 9, but may also be obtained by replacing an optical pickup in any other known optical disk apparatus with the optical pickup according to the present invention.

Embodiment 5

Figure 10:
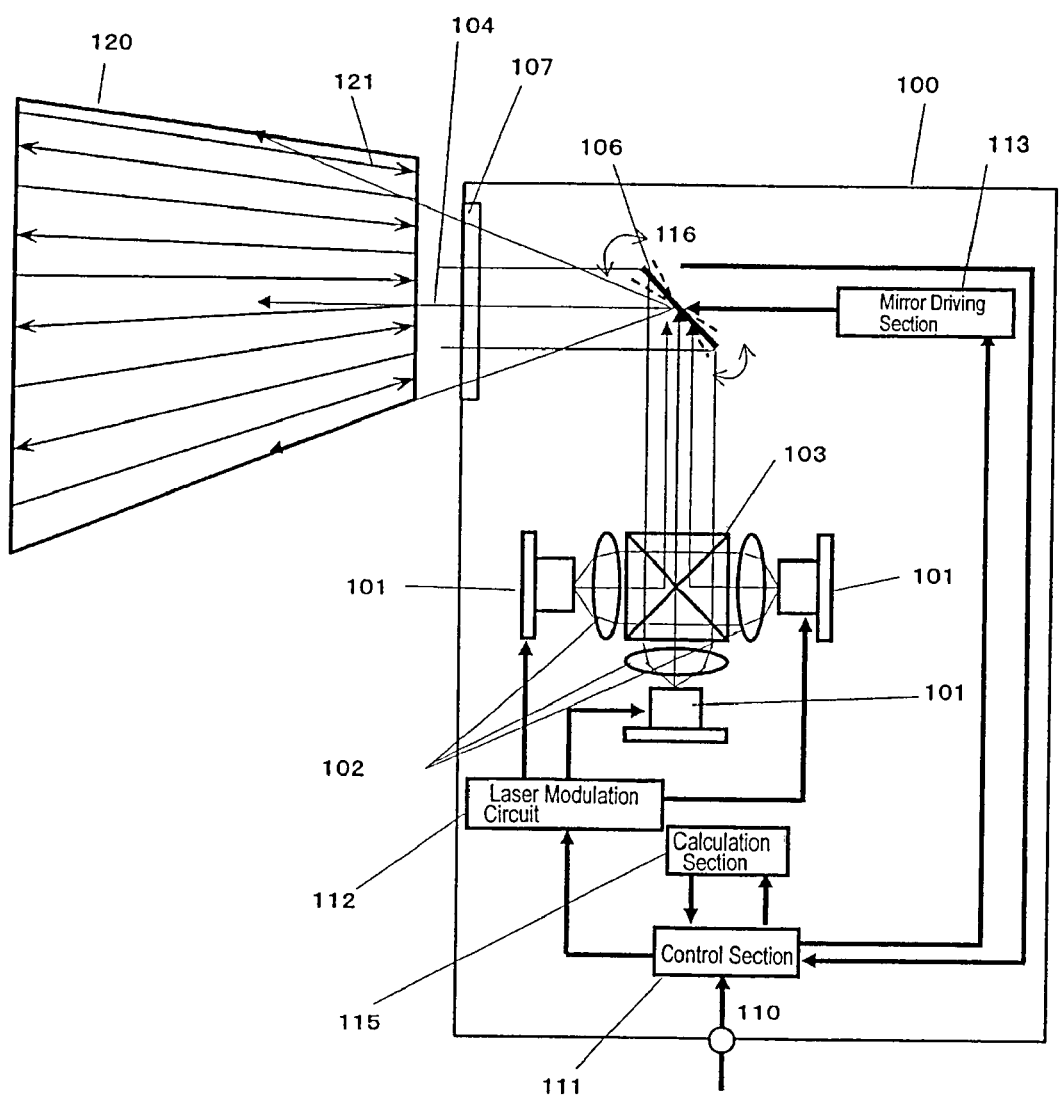
FIG. 10 A diagram showing an embodiment of a display according to the present invention.

FIG. 10 is a construction diagram showing an embodiment of a laser projector according to the present invention.

A laser projector 100 of the present embodiment includes: three laser light sources 101 for emitting light beams of three primary colors (RGB); a scan mirror section 116 for reflecting the light beams emitted from the laser light source 101 and scanning a screen 120 with the reflected beams; and so on. In the present embodiment, light beams of three colors which are emitted from the laser light source 101 are collimated by respective collimating lenses 102, and thereafter are merged by a dichroic prism 103 to form a single projection beam 104. The projection beam 104 is reflected by a scan mirror section 106 and thereafter projected toward the screen 120 via an aperture 107. The scan mirror section 106 is a micro-mechanical structure having the construction illustrated in Embodiment 1. The scan mirror section 106 includes one mirror having a high planarity, and is rapidly driven in accordance with an applied voltage. As a result, the projection beam 104 is able to scan a large-sized screen 120, and arbitrarily form an image thereon. The shape of the mirror in the scan mirror section 106 may be a hexagon inscribing in a circle having a diameter of about 1 mm, for example.

An image signal 110 which defines an image to be displayed on the screen 120 is input to a control section 111. In synchronization with a laser modulation by a laser modulation circuit 112, a mirror driving section 113 drives the scan mirror section 106. An angular displacement signal 116 which defines the angle of the scan mirror section 106 is supplied to the control section 111, whereby feedback control is performed.

The beam 104 which scans the screen 120 via the scan mirror section 106 draws a beam spot locus 121 on the screen 20.

In the display of the present embodiment, the movable section of the scan mirror section 106 is light-weighted and yet has a high rigidity and planarity. Thus, rapid driving by the mirror driving section 113 becomes possible.

INDUSTRIAL APPLICABILITY

A micro-mechanical structure according to the present invention is useful as a micromirror structure for driving an optical deflector which rapidly changes the direction of light, and is particularly suitable as a micromirror device for a wave aberration correcting device which is required to have a planarity with high precision, and is applicable to various adaptive optics.

The invention claimed is:

1. A micro-mechanical structure comprising:
a base;
an elastic supporting member having elasticity, the elastic supporting member being formed on the base; and
a movable section supported by the elastic supporting member so as to be capable of making a relative move with respect to the base, wherein,
the movable section includes:
a first plate portion opposing the base via a first gap; and
a second plate portion having a link portion, the second plate portion being affixed to the first plate portion via the link portion;
wherein the link portion is a vertical rib protruding from the second plate portion toward the first plate portion, and the vertical rib includes: a portion having a first height so as to be in contact with the first plate portion; and a portion having a second height so as to oppose the elastic supporting member via a second gap, the second height being smaller than the first height;
the elastic supporting member and the first plate portion are formed so as to be coplanar with each other, and the elastic supporting member is made integral with the first plate portion; and
the second plate portion is shaped so as to cover at least a portion of the elastic supporting member, and the vertical rib is not in contact with the elastic supporting member.

2. The micro-mechanical structure of claim 1, comprising a light reflecting surface in at least a portion of the second plate portion.

3. The micro-mechanical structure of claim 1, wherein the second gap is narrower than the first gap.

4. The micro-mechanical structure of claim 1, wherein the first plate portion and the elastic supporting member are formed of a same metal material and have a same thickness.

5. The micro-mechanical structure of claim 1, wherein the second plate portion and the link portion are formed of a same metal material.

6. The micro-mechanical structure of claim 1, wherein the second plate portion has an area of no less than 100 μm² and no more than 1 mm².

7. The micro-mechanical structure of claim 1, wherein,
the first plate portion and the second plate portion each have a thickness of no less than 0.1 μm and no more than 5 μm; and
the link portion has a thickness of no less than 0.2 μm and no more than 10 μm.

8. The micro-mechanical structure of claim 1, wherein the link portion is formed of a metal material which is buried in a trench in a sacrificial layer above the first plate portion.

9. The micro-mechanical structure of claim 8, wherein the metal material is aluminum, copper, nickel, or an alloy containing at least one such metal.

10. The micro-mechanical structure of claim 1, further comprising a stationary electrode provided on the base, the stationary electrode opposing the first plate portion via a third gap, wherein,
the first plate portion and the stationary electrode function as an electrostatic actuator.

11. An optical pickup comprising:
a light source for emitting a light beam;
an objective lens for converging the light beam onto an optical disk;
a photodetector for receiving the light beam reflected from the optical disk and generating an electrical signal; and
an aberration correcting device for correcting an aberration of the light beam, wherein,
the aberration correcting device includes:
a base;
an elastic supporting member having elasticity, the elastic supporting member being formed on the base; and
a movable section supported by the elastic supporting member so as to be capable of making a relative move with respect to the base, wherein,
the movable section includes:
a first plate portion opposing the base via a first gap; and
a second plate portion having at least one vertical rib, the second plate portion being affixed to the first plate portion via the vertical rib;
wherein the vertical rib includes: a portion having a first height so as to be in contact with the first plate portion; and a portion having a second height so as to oppose the elastic supporting member via a second gap, the second height being smaller than the first height;
the elastic supporting member and the first plate portion are formed so as to be coplanar with each other, and the elastic supporting member is made integral with the first plate portion; and
the second plate portion is shaped so as to cover at least a portion of the elastic supporting member, and the vertical rib is not in contact with the elastic supporting member.

12. An optical disk apparatus comprising:
a motor for rotating an optical disk;
an optical pickup for accessing a desired track on the optical disk; and
a signal processing section for reproducing data from the optical disk based on an output from the optical pickup, wherein,
the optical pickup includes:
a light source for emitting a light beam;
an objective lens for converging the light beam onto an optical disk;
a photodetector for receiving the light beam reflected from the optical disk and generating an electrical signal; and
an aberration correcting device for correcting an aberration of the light beam, wherein,
the aberration correcting device includes:
a base;
an elastic supporting member having elasticity, the elastic supporting member being formed on the base; and
a movable section supported by the elastic supporting member so as to be capable of making a relative move with respect to the base, wherein,
the movable section includes:
a first plate portion opposing the base via a first gap; and
a second plate portion having at least one vertical rib, the second plate portion being affixed to the first plate portion via the vertical rib;
wherein the vertical rib includes: a portion having a first height so as to be in contact with the first plate portion; and a portion having a second height so as to oppose the elastic supporting member via a second gap, the second height being smaller than the first height;
the elastic supporting member and the first plate portion are formed so as to be coplanar with each other, and the elastic supporting member is made integral with the first plate portion; and the second plate portion is shaped so as to cover at least a portion of the elastic supporting member, and the vertical rib is not in contact with the elastic supporting member.

13. A display device comprising:

a light source for emitting a light beam;

a light source driving section for modulating an intensity of the light beam in accordance with an image signal; and a scan mirror section for scanning a screen with the light beam, wherein, the scan mirror section includes:

a base;

an elastic supporting member having elasticity, the elastic supporting member being formed on the base; and a movable section supported by the elastic supporting member so as to be capable of making a relative move with respect to the base, wherein, the movable section includes:

a first plate portion opposing the base via a first gap; and a second plate portion having at least one vertical rib, the second plate portion being affixed to the first plate portion via the vertical rib, wherein, the vertical rib includes: a portion having a first height so as to be in contact with the first plate portion; and a portion having a second height so as to oppose the elastic supporting member via a second gap, the second height being smaller than the first height;

the elastic supporting member and the first plate portion are formed so as to be coplanar with each other, and the elastic supporting member is made integral with the first plate portion; and the second plate portion is shaped so as to cover at least a portion of the elastic supporting member, and the vertical rib is not in contact with the elastic supporting member; and wherein the second plate portion functions as a mirror for reflecting the light beam.

* * * * *

UNITED STATES PATENT AND TRADEMARK OFFICE
CERTIFICATE OF CORRECTION

PATENT NO. : 7,742,219 B2
APPLICATION NO. : 11/910773
DATED : June 22, 2010
INVENTOR(S) : Akira Kurozuka, Hironori Tomita and Yoshihiro Mushika It is certified that error appears in the above-identified patent and that said Letters Patent is hereby corrected as shown below:

Title Page, item (56); under "OTHER PUBLICATIONS", "Jul. 18, 006" should read -- Jul. 18, 2006 --.

Signed and Sealed this

Twenty-sixth Day of October, 2010

David J. Kappos
*Director of the United States Patent and Trademark Office*